Oct. 1, 1968 ANDRÉ-JEAN C. BERTEAUD ET AL 3,404,355

POWER LIMITING DEVICES FOR HIGH FREQUENCY WAVES

Filed May 6, 1966 2 Sheets-Sheet 1

INVENTOR

BY William D Stokes

ATTORNEY

Oct. 1, 1968 ANDRÉ-JEAN C. BERTEAUD ET AL 3,404,355

POWER LIMITING DEVICES FOR HIGH FREQUENCY WAVES

Filed May 6, 1966 2 Sheets-Sheet 2

INVENTOR

BY William D. Stokes
ATTORNEY 3,404,355
Patented Oct. 1, 1968

3,404,355

POWER LIMITING DEVICES FOR HIGH FREQUENCY WAVES

André-Jean Charles Berteaud, Bourg-la-Reine, Hubert Marcel Joseph Pascard, Meudon, and Roger Jean Joseph Vautier, Bourg-la-Reine, France, assignors to Centre National de la Recherche Scientifique, Paris, France Filed May 6, 1966, Ser. No. 548,149
Claims priority, application France, May 17, 1965, 17,320
2 Claims. (Cl. 333—17)

ABSTRACT OF THE DISCLOSURE

The device comprises at least one ferromagnetic thin layer, which may be electrically conducting, disposed parallel to the magnetic field of the wave to be controlled, and means for magnetizing this layer by means of a continuous magnetic field whose resultant has at least one component perpendicular to that layer. The value of this component is chosen such that it corresponds to a maximum power absorption by the layer (ferromagnetic resonance), or at least to a relatively high absorption, when the power level of the wave is equal to that which it is desired to limit as much as possible, this value being, in the preferred case where the power of the wave is variable, lower than that corresponding to the maximum absorption for the minimum power level of the wave.

The present invention relates to devices capable of limiting the power of high frequency electromagnetic waves (that is to say of a frequency higher than 1 mHz. and preferably higher than 1000 mHz.) transmitted from the input to the output of such a device, said power being preferably variable and its ratio of transmission being the smaller as this power is higher. The present invention is more especially concerned with devices of this kind used for protecting receivers against the effect of powerful pulses produced by transmitting systems in radars having the same antenna for transmission and reception.

The chief object of our invention is to provide a device of this kind which is better adapted to meet the requirements of practice than those used up to this time.

Our invention consists chiefly in providing the devices in question with at least one forromagnetic thin layer, which may be electricity conducting, disposed parallel to the magnetic field of the wave to be controlled and with means for magnetizing said layer by means of a continuous magnetic field the resultant of which has at least one component perpendicular to said layer, the value of this component being chosen such that it corresponds to a maximum power absorption by the layer (ferromagnetic resonance), or at least to a relatively high absorption, when the power level of the wave is equal to that which it is desired to limit as much as possible, this value being, in the preferred case where the power of said wave is variable, lower than that corresponding to the maximum absorption for the minimum power level of the wave.

A preferred embodiment of the present invention will be hereinafter described, with reference to the appended drawings, given merely by way of example, and in which.

Figure 1:
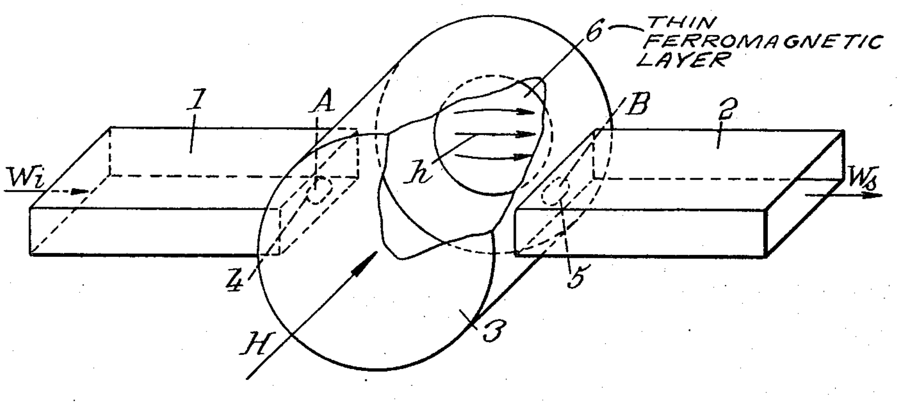
FIG. 1 is a diagrammatic perspctive view, with parts cut away, of a power limiting device according to this invention.

As diagrammatically shown by FIG. 1, the object of the present invention is to limit the power of a high frequency electromagnetic wave between a point A reached by the incident wave W*i* travelling through a waveguide 1 and a point B from which the outgoing wave travels through another waveguide 2.

We interpose between points A and B a cell 3 communicating with said respective points through suitable openings 4 and 5 which may be adjustable, being for instance limited by iris diaphragms.

We apply upon at least one of the inner walls of cell 3 at least one thin ferromagnetic layer 6 parallel to the magnetic field $h$ of the electromagnetic waves in the portion of cell 3 where this layer is placed.

Thin layer 6 is magnetized by means of a continuous magnetic field H perpendicular to this layer or at least having a component perpendicular to this layer, this field H being produced, for instance, by coils, not shown by the drawing, through which a direct current is made to flow.

The direction and the value of field H are chosen in such manner as to obtain a maximum power absorption for the desired power level of field $h$.

Figure 2:
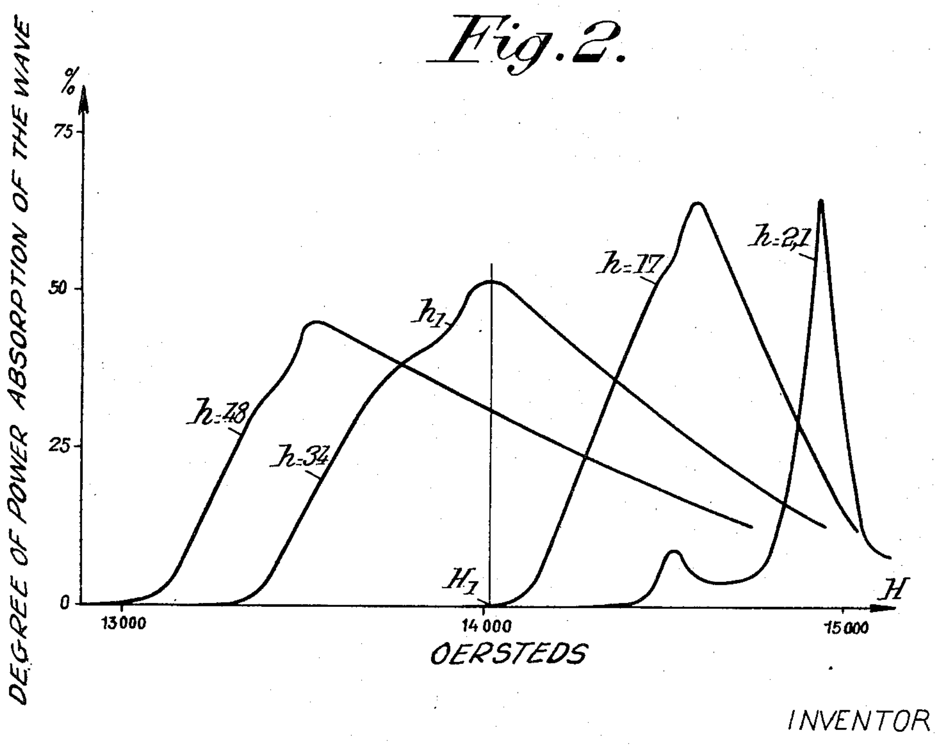
FIGS. 2, 3 and 4 are diagrams for explaining the operation of this power limiting device.
Figures 3, 4:
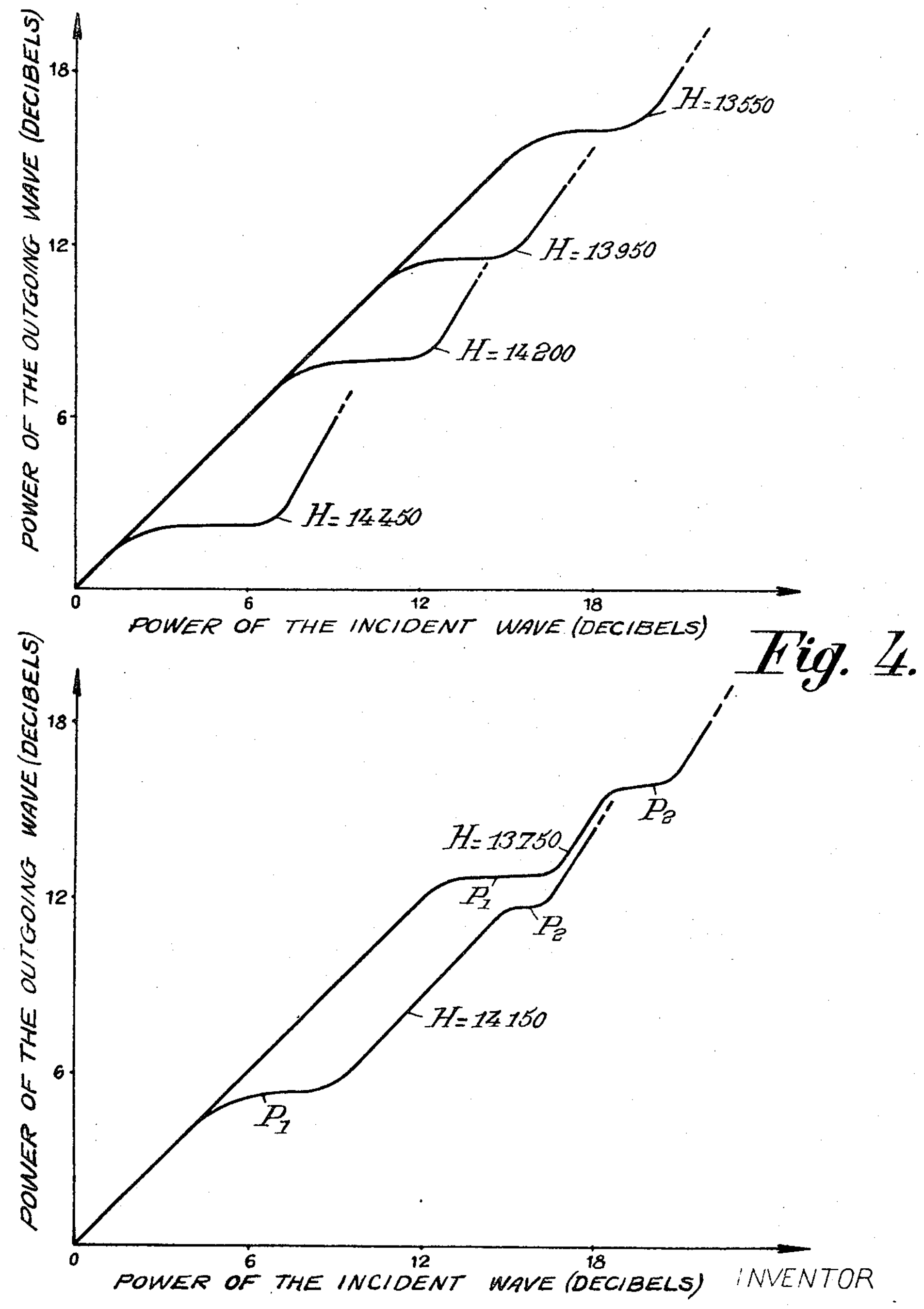

In order to make this choice, we rely upon the following properties which have been discovered by us and which will be stated with reference to FIGS. 2 to 4.

In the diagram of FIG. 2, we have plotted in abscissas the field H (in oersteds) and in ordinates the degree of power absorption of the wave, that is to say the ratio $$\frac{a_o - a}{a_o}$$

(wherein $a_o$ is the amplitude of the transmitted wave when the continuous field that is applied is zero and $a$ is the amplitude of the transmitted wave when this field has a value equal to H (ratio expressed in percents).

Each of the curves of FIG. 2 corresponds to a given value of the power of the incident wave W*i*, expressed in intensity of the field $h$ (in oersteds).

It will be seen that, for a given incident power, there is a well characterized absorption peak.

It is further seen that when the level of this incident power increases the peak moves toward the lower values of the polarizing field H at the same time as it widens and its maximum value decreases.

It is this property which is taken advantage of according to the present invention in the following manner.

If, the power of the incident wave being variable, it is desired to limit the transmission of this wave when its power is maximum and corresponds to a field $h_1$ and to transmit a proportion of said wave the greater as the power is lower the direction and the value of the polarizing field are chosen in such manner that the value $H_1$ of its component perpendicular to the layer corresponds to the maximum of the absorption curve relative to $h_1$ in FIG. 2.

It will be seen that this value $H_1$ is lower than those of field H corresponding to the maximum absorptions for low power levels (low values of $h$) and that, for said value $H_1$ of the magnetizing field, as said power goes decreasing, the absorption increases from a low value, generally equal to zero, for low values of $h$ up to a maximum value for $h_1$.

It is further found that this absorption again decreases when the power of the incident wave exceeds the maximum level corresponding to $h_1$, but, as a rule, this is not a drawback since, for practical purposes, said maximum power level is known in advance and cannot be exceeded (with the provision of a suitable safety margin).

It will be reminded that the value $H_r$ of the field H corresponding to the maximum power absorption by the thin layer (ferromagnetic resonance) for low power levels of the incident wave is linked to the frequency $f$ of this wave by the following relation:

$$2\pi f=\gamma(H_r-4\pi M)$$

wherein $\gamma$ is the gyromagnetic constant of the material of the layer and $4\pi M$ is the saturation magnetization of this material.

The above data are also illustrated by the diagram of FIG. 3 where we have plotted in abscissas the power of the incident wave $Wi$ expressed in decibels (the zero decibel value corresponds to 5.35 oersteds) and in ordinates the power of the outgoing wave $W_s$, similarly expressed.

The four branches of the curve correspond respectively to four different values of the polarizing field H, which values go decreasing toward the top.

It will be seen that for low values of the incident power, the transmitted power is equal to the incident power (absorption equal to zero so that the absorption curve coincides with the bisectrix of the axes of coordinates). From a given level of this incident power (this level being the lower as the polarizing field is higher), the absorption increases, so that a new increase of the incident power produces practically no increase of the transmitted power (horizontal portion of the curve). Finally, starting from another level, the absorption decreases and the curve tends toward the above bisectrix.

It follows that, for a given thin layer, the level of operation of the above power limiter may be easily adjusted by acting upon the value of the component H of the polarizing field perpendicular to this thin layer, said level being the higher as said value is lower.

Merely by way of indication and of course without implying any limitation of the scope of the invention, it will be indicated that the numerical values of the curves of FIGS. 2 and 3 correspond to experiments made in the following conditions:

Cell consisting of a cylindrical cavity having brass walls of the type of that shown by FIG. 1, with flat ends of 27 mm. diameter, resonating in the $TE_{111}$ fashion and the overtension of which under load averages 1500;

Incident wave produced by a magnetron and oscillating in $TE_{01}$ fashion;

Frequency of this incident wave 9,365 mHz.;

Peak power in the cavity; from 0 to 2.9 kw. which corresponds to a field $h$ ranging from 0 to 60 oersteds;

Thin layer constituted by a deposit of Permalloy (alloy of 83% of Ni and 17% of Fe) atomized under vacuum over a flat glass support in the form of a circular disc, said support being then applied upon one of the ends of the cavity in such manner that the disc is directly in contact with this end wall and centered thereon, this disc having a diameter of 10 mm. and a thickness of 100 angstrom;

Direction of the polarizing field parallel to the axis of the cavity.

For a given value of this polarizing field H, the position and the length of the absorption horizontal portions of the curve of FIG. 3 vary with the nature and the thickness of the thin layer.

Therefore, it may be advantageous to use simultaneously in the same cell several thin layers of different characteristics serving each to the absorption of a different power level.

FIG. 4 shows what the absorption curves of FIG. 3 become when, in addition to the thin layer of 1000 A. above referred to, the cavity comprises a second thin layer similar to the first one with the exception of its thickness which in this case is 1400 A. It will be seen that, for a given value of the polarizing field, the absorption curve comprises, in addition to a first horizontal portion $P_1$ similar to the preceding one, a second horizontal portion $P_2$ due to the presence of the second layer.

In the experiment corresponding to this FIG. 4, the two layers were applied respectively on the two end walls of the cavity but they might also have been juxtaposed on the same end wall.

In particularly advantageous embodiments we may make use of a plurality of thin layers of complementary characteristics corresponding respectively in FIG. 3 to horizontal portions located substantially in line with one another, which will give a particularly efficient power limitation:

The thickness of every thin layer generally ranges from 100 to 100,000 A. preferably from 500 to 5,000 A.

These layers may be formed in any suitable manner, for instance by evaporation in a vacuum or by electrolyses.

Our invention also applies to the case where the cell would be made to include flat or slightly curved surfaces of great area parallel both to the magnetic field $h$ of the waves to be controlled, these surfaces being coated with at least one thin ferromagnetic layer.

Our invention also includes the case where the cell, instead of consisting of a resonant cavity with a rather narrow frequency range of operation, would be constituted by a cell having a wider frequency range, for instance of the type called "progressive wave type."

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What we claim is:

1. A device for limiting the power of high frequency electromagnetic waves which comprises, in combination,
- cell means having an input and an output for the transmission therethrough of said waves,
- a ferromagnetic thin layer in said cell means extending parallel to the magnetic field of said waves, and
- means for magnetizing said layer by means of a continuous magnetic field the resultant of which has at least one component perpendicular to said layer, the value of this component being chosen such that it corresponds to a relatively high power absorption by said layer, when the power level of the wave is equal to that which it is desired to limit as much as possible.

2. A power limiting device according to claim 1, wherein the power of the wave to be controlled is variable, the value of the component perpendicular to said layer being lower than that which corresponds to maximum absorption for the minimum power level of the wave.

References Cited

J. H. E. Griffiths, Anomalous High-Frenquency Resistance of Ferromagnetic Metals, Nature, Nov. 9, 1946, pp. 670, 671.

HERMAN KARL SAALBACH, *Primary Examiner.*

P. L. GENSLER, *Assistant Examiner.*